(12) United States Patent
Blanc

(10) Patent No.: US 7,280,198 B2
(45) Date of Patent: Oct. 9, 2007

(54) APPARATUS FOR OPTICALLY ANALYZING PRODUCTS SUCH AS FRUIT HAVING BILATERAL IMAGING DEVICES

(75) Inventor: Philippe Blanc, Montauban (FR)

(73) Assignee: Materiel pour l'Arboriculture Fruitiere, Montauban (FR)

( * ) Notice: Subject to any disclaimer, the term of this patent is extended or adjusted under 35 U.S.C. 154(b) by 61 days.

(21) Appl. No.: 11/203,126

(22) Filed: Aug. 15, 2005

(65) Prior Publication Data

US 2006/0038985 A1    Feb. 23, 2006

(30) Foreign Application Priority Data

Aug. 17, 2004   (FR)   .................................. 04 08923

(51) Int. Cl.
*G01N 21/00* (2006.01)
(52) U.S. Cl. .................... 356/237.1; 209/701
(58) Field of Classification Search ............ 356/237.1, 356/240.1, 239.7, 444; 209/701, 939, 555–558, 209/563–566, 576–577, 540–545; 208/580–581
See application file for complete search history.

(56) References Cited

U.S. PATENT DOCUMENTS 2,428,243 A  *  9/1947  Raskin ........................ 62/251

FOREIGN PATENT DOCUMENTS

| EP | 0 527 519 | 7/1992 |
| EP | 0 670 276 | 2/1995 |
| EP | 1 00 883 | 10/1999 |
| EP | 1 040 058 | 10/2000 |
| WO | WO 03/023455 | 3/2003 |

\* cited by examiner

*Primary Examiner*—Gregory J. Toatley, Jr.
*Assistant Examiner*—Tri Ton
(74) *Attorney, Agent, or Firm*—Young & Thompson

(57) ABSTRACT

An apparatus for optically analyzing products such as fruit for automatic sorting of the products, includes at least one conveying line (1, 2), a plurality of analysis stations, and a device for driving each product in rotation. The imaging devices (12 to 19) of the different analysis stations are arranged in two lateral series located on each side of the longitudinal vertical plane of each conveying line (1, 2).

20 Claims, 6 Drawing Sheets

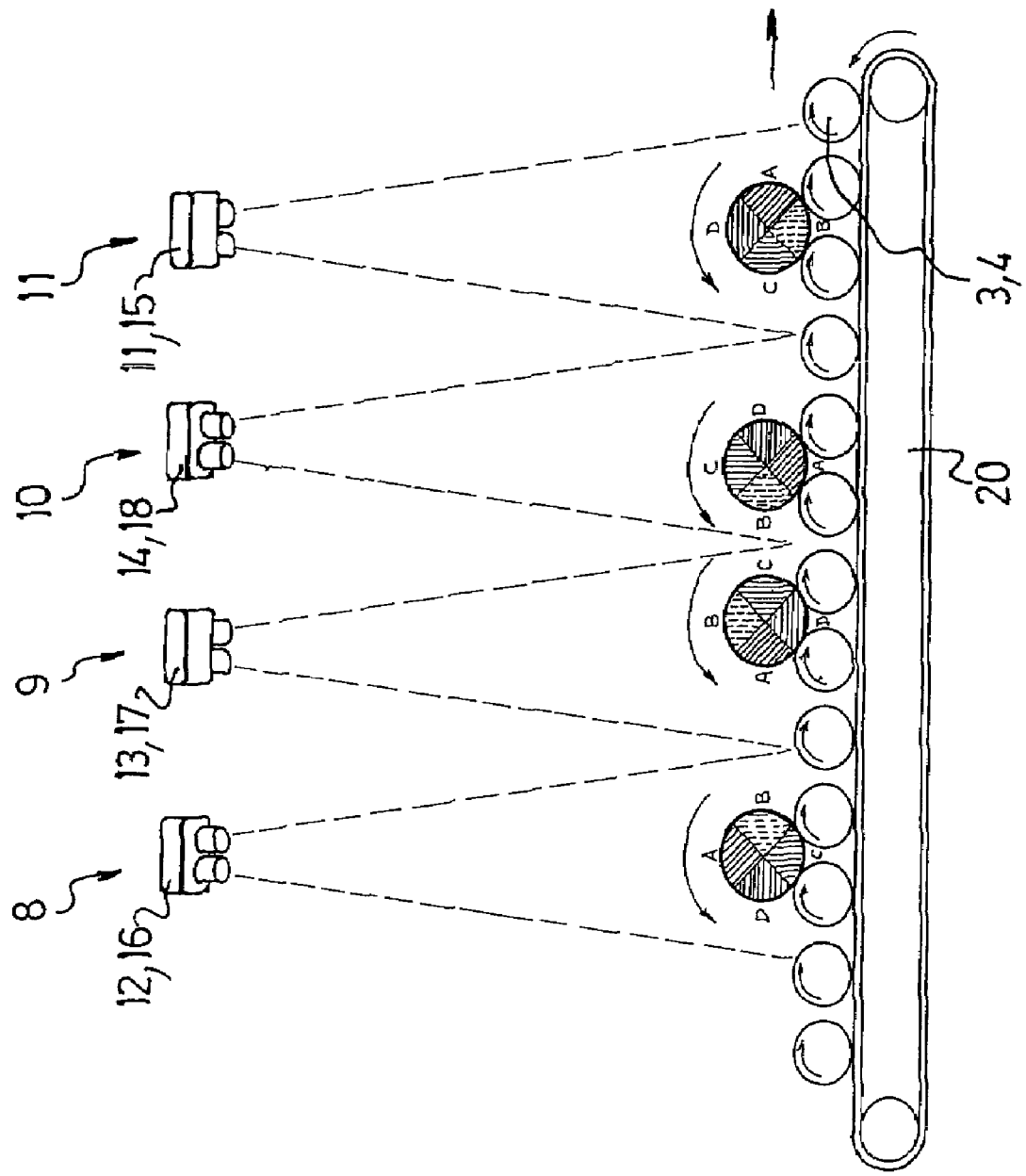

APPARATUS FOR OPTICALLY ANALYZING PRODUCTS SUCH AS FRUIT HAVING BILATERAL IMAGING DEVICES

The invention relates to an apparatus for optically analyzing products that are substantially rotationally symmetrical—in particular substantially spheroidal—such as fruit or vegetables, for automatic sorting of the products.

Already known (WO 01/01071) is an optical analysis apparatus comprising at least one line for conveying individually and successively products transported in a continuous line in a longitudinal direction with respect to a fixed structure, and three successive analysis stations, a first analysis station having two imaging devices arranged one on each side of the longitudinal direction and having axes inclined to form a V-shape with a vertex angle of from 90° to 130°, and two analysis stations, each provided with an imaging device arranged vertically above the longitudinal direction. The products are driven in rotation on themselves as they are transported in line past the successive analysis stations, so that different faces of each product are seen by the different imaging devices. A processing unit receives the images acquired and calculates data to be used in sorting the products on the basis of corresponding images showing four complementary faces of the surface of the products and according to predefined programmed criteria.

This apparatus proves generally satisfactory. In particular, it represents a major advance with respect to preceding apparatuses having cameras positioned only vertically above the products, or having a single analysis station. In particular, it permits high-powered analysis of all parts of the surface of the products even when there is a relatively large deviation in the dimensions and/or shape of the products with respect to their average dimensions and shape; this results from the fact that a plurality of photographs of each product are taken by each imaging device, allowing the photographs used for analysis to be selected according to the real dimensions of the products while their circumferential velocity as they are driven in rotation remains the same.

Despite this, it is found that some zones of the surface of the products are not analyzed appropriately or sufficiently finely.

Thus, certain major defects located in immediate proximity to the periphery of an image are not correctly measured, or even are not detected. Indeed, it should be noted that, taking account of the curvature of the products, the peripheral zones of the images correspond to portions of surface that are relatively inclined with respect to the optical axis of the camera (glancing light views), entailing significant radial contraction of distances and reduced precision of analysis.

Conversely, other minor defects located in the central portion of an image are interpreted as too large by the processing unit.

Moreover, defects overlapping two different faces of a product seen by two different cameras present difficult problems of logical interpretation for the processing unit. Indeed, among the criteria utilized in subsequent sorting, the area of the defects, the number of defects per product and the minimum size of a defect on the product, may be mentioned. These criteria are poorly recognized by the processing unit when a defect overlaps a plurality of faces seen (i.e. is partially represented in a plurality of different images).

It is important from the industrial and economic point of view that the analysis apparatus does not interpret as defective a product which in reality satisfies the required minimum quality criteria. In other words, it is advantageous to prevent products from being allocated erroneously (by the automatic sorting) to a lower quality category than that to which they belong in reality.

In the case of a defect which overlaps a plurality of seen faces of a product, a single defect may be interpreted by the processing unit as a plurality of different defects. Bearing in mind the above-mentioned geometry of the arrangement and orientation of the different imaging devices of the different analysis stations, and because in practice products such as fruit or vegetables are not perfect spheres, the correlation of the defects that can be detected between different images is extremely difficult to achieve.

More generally, the inventor has found that, because of the design and construction of the optical analysis apparatus, any difference introduced between the photographs taken by the different imaging devices entails, firstly, increased complexity in the subsequent processing logic that allows (surface) defects of the products to be detected and taken into account and, secondly, reduced reliability of the results when the products have very distorted shapes (with wide local divergences from their theoretical shape, in particular from a perfect sphere).

The fact that the photographs taken by the device of WO 01/01071 are not perfectly symmetrical, and correspond to non-identical complementary zones (the theoretical limits of which are fixed at the start), thus entails increased processing complexity and reduced reliability for some products of distorted shape, the complementary zones being capable of corresponding to zones which actually overlap the three-dimensional surface of the products, or some zones of this surface being capable of not being seen.

Likewise, a lack of homogeneity in the lighting of the different zones of the products seen by each imaging device, and/or the fact that the lighting of the products is not identical for the different imaging devices, bring about the same disadvantages In the above-mentioned device the products are illuminated by lamps arranged above the conveying line and above the products. Thus, if the upper face of the product is relatively well illuminated, the lower lateral marginal portions of the faces of the products are less well illuminated. This lack of homogeneity in the lighting of different photographs taken also poses a problem of interpretation and analysis of the images by the processing unit. Thus, it can happen that some defects on the products are considered as lighting faults or, conversely, that a less well-lit zone is treated as a defect.

Another problem encountered in practice with the above-mentioned known device is that of installing the different elements with respect to one another to form a compact assembly, in particular one that has a plurality of parallel conveying lines, while avoiding parasitic reflections and interference of the optical system with the mechanical elements and the generally aggressive, dirty and humid environment of the lines conveying the products. This problem of installation proves extremely difficult in practice and insurmountable incompatibilities are often encountered.

It is an object of the invention to mitigate these disadvantages by proposing an apparatus for optically analyzing products which is simpler in construction and in the processing logic of the processing unit, and which produces more reliable and accurate results.

In particular it is an object of the invention to propose an optical analysis apparatus in which illumination of the faces of the products can be achieved simply, substantially uniformly, and in a similar manner for all the photographs taken at all the successive analysis stations, while allowing all parts of the surface of the products to be photographed (unlike the previous apparatuses having cameras disposed only vertically above the products and/or having a single analysis station).

More particularly, it is an object of the invention to enable the different successive analysis stations to be installed in a similar manner for all the analysis stations, thus facilitating installation and control, and the programming of the processing unit, and having improved performance as compared to that of the apparatus described in WO 01/01071.

To achieve these objects, the invention relates to an apparatus for optically analyzing products that are substantially rotationally symmetrical—in particular substantially spheroidal—such as fruit, so that they can be sorted automatically, comprising:

at least one conveying line for transporting the products continuously in line in a longitudinal direction with respect to a fixed structure and comprising a plurality of individual supports of the products aligned one behind the other in the longitudinal direction;

a plurality of P stations for optically analyzing the external surface of the products, said analysis stations being disposed successively at a distance from one another in the longitudinal direction and each comprising at least one imaging device fixed to the structure and having an optical axis so oriented towards a conveying line as to be able to produce images of the products being transported past said imaging device by said conveying line;

a device for driving in rotation each product carried by a conveying line during its transportation past the different successive analysis stations in such a way that the different faces of each product are seen by the different successive imaging devices, wherein:

each imaging device is arranged above the conveying line towards which it is oriented and is offset laterally with respect to a longitudinal vertical plane containing the longitudinal direction;

the different imaging devices of the different analysis stations are arranged in two lateral series of imaging devices, a first lateral series located on one side of the longitudinal vertical plane and including N1 imaging devices belonging to P1 different analysis stations, and a second lateral series located on the other side of the longitudinal vertical plane and including N2 imaging devices belonging to P2 different analysis stations, N1, N2, P1 and P2 being whole numbers other than zero, in particular greater than 1.

The inventor has found that solely by arranging the imaging devices above and beside the conveying line, with their optical axes inclined, and not vertically above the conveying line, numerous advantages enabling the above-mentioned problems to be solved are obtained in practice.

According to the invention, the drive device is advantageously so adapted that a product having a diameter corresponding to a predetermined reference diameter is rotated on itself about an axis at least substantially orthogonal to the longitudinal direction, of the order of or greater than $2\pi-2\pi(P1+P2)$ (throughout the text, unless otherwise indicated, all angle values are given in radians) between the first and last analysis stations in the longitudinal direction. Throughout the text the "diameter" of a product means that of a cylinder of revolution circumscribing the product, the latter not needing to be perfectly cylindrical in revolution. In the case of spheroidal products such as apples, citrus fruits, tomatoes, etc., the diameter of the product is that of the sphere circumscribing the product.

Different distributions and arrangements of the imaging devices are possible. In an analysis apparatus according to the invention it is advantageously provided that $P1 \geq 2$, $P2 \geq 2$, that the imaging devices of the first lateral series belong to analysis stations different from those to which the imaging devices of the second lateral series belong, that the drive device is so adapted that a product having a predetermined reference diameter is subjected to a rotation on itself of the order of $2\pi/P1$ between two successive analysis stations of the first lateral series and of the order of $2\pi/P2$ between two successive analysis stations of the second lateral series.

In addition, according to the invention the imaging devices of the first lateral series and those of the second lateral series are advantageously intercalated alternately in the longitudinal direction, two analysis stations directly successive in the longitudinal direction having, in the one case, an imaging device belonging to the first lateral series and, in the second case, an imaging device belonging to the second lateral series. In this way the drive device may be so adapted that a product having a predetermined reference diameter is subjected to a rotation on itself of the order of $2\pi-2\pi/(P1+P2)$ only between the first and last analysis stations.

In an apparatus according to the invention it is also advantageously provided that $P1=P2=P/2$, that the spacing between the successive analysis stations in the longitudinal direction is regular, that the drive device is so adapted that a product having a predetermined reference diameter is subjected to a rotation on itself of the order of $2\pi/P$ between two successive analysis stations. In this way the operating logic may be greatly simplified, all the imaging devices producing images of similar and complementary faces of the product.

Furthermore, according to the invention the imaging devices are advantageously so arranged that their optical axes form with the longitudinal vertical plane a predetermined angle, called the angle of the inclination, from 20° to 45°, in particular of the order of 36°. It is found in practice that these inclination values are extremely advantageous, in particular in terms of the space requirement and compatibility with the different mechanical elements of a conveying line or even of a plurality of parallel juxtaposed conveying lines. They permit simultaneous analysis of all the faces of the products, the views photographed having overlap zones which are significant but which are easily taken into account in the image analysis logic of the processing unit, while leaving a large space free above the conveying line for implementing appropriate uniform illumination of the products.

In addition, according to the invention all the imaging devices of the same lateral series are advantageously so arranged that their optical axes all form the same angle of inclination with the longitudinal vertical plane. According to the invention, the angle of inclination $\alpha 1$ formed with the longitudinal vertical plane by the optical axes of the imaging devices of the first lateral series is advantageously equal to the angle of inclination $\alpha 2$ formed with the longitudinal vertical plane by the optical axes of the imaging devices of the second lateral series. In addition, according to the invention all the imaging devices of the same lateral series oriented towards the same conveying line are advantageously fixed to the structure at the same level and with the same lateral offset with respect to the longitudinal direction of this conveying line. According to the invention all the imaging devices are advantageously fixed to the structure at the same horizontal level above the conveying line(s).

In this way, all the imaging devices produce images equivalent to one another, and their arrangement, installation and control, and the programming of the processing unit, are very greatly simplified. The reliability of the logic used to take account of the dimensional variations of the products with respect to the predetermined reference diameter, which may be that described in WO 01/01071, is increased.

In an especially advantageous embodiment according to the invention, P1=P2=2. The drive device may be adapted to rotate a product having a reference diameter of the order of π between two analysis stations adjacent in the longitudinal direction and having imaging devices on the same side, i.e. belonging to one of the lateral series, and of the order of π/2 between two analysis stations which are directly successive in the longitudinal direction.

According to the invention, each analysis station advantageously includes one and only one imaging device for each conveying line; in other words, N1=P1 and N2=P2.

Moreover, an apparatus according to the invention also advantageously includes an illumination device arranged above the products being transported in line past the analysis stations and, located opposite each imaging device with respect to the conveying line towards which it is oriented, a screen forming a background for each image taken. Such a background, for example, black (or absorbent within the spectral region of the illumination and/or of the imaging devices) enables the contrast of the images produced, and therefore their subsequent automatic analysis by the processing unit, to be enhanced. The illumination device advantageously includes at least one illumination chamber having reflective and diffusing walls so as to illuminate the products indirectly with diffuse light.

In addition, according to the invention the apparatus advantageously includes at least one reflector, called the lower lateral reflector, for each imaging device, said reflector being arranged beside and along the corresponding conveying line and being adapted to improve the illumination of a lower lateral surface zone of the products. It should be noted that the backgrounds and the reflectors of the different imaging devices of the different successive analysis stations may be formed by flat walls extending along, beside and below the conveying line (perpendicularly to the optical axes of opposed imaging devices), each wall having alternately in the longitudinal direction dark, matt portions and reflective portions, or portions which are reflective and diffusing at the same time, to form the reflector.

According to the invention each imaging device is advantageously adapted to take a plurality of successive photographs of each product being transported past it. In this way, account can easily be taken of the dimensional variations of the products, as described, for example, in WO 01/01071. In addition, according to the invention each imaging device advantageously includes a plurality of cameras producing images of different optical types. Thus, a plurality of images of each face of each product may be produced, for example, in different wavelengths. For example, an infrared camera and a camera in the visible region (RGB) are provided for each imaging device.

According to the invention the analysis apparatus advantageously comprises:
at least two parallel conveying lines arranged in substantially the same horizontal plane;
at least one pair of imaging devices for each analysis station, one of which imaging devices is oriented towards one of the conveying lines while the other is oriented towards another conveying line. The same analysis stations are thus provided with a common illumination device for the different conveying lines. As indicated above, the invention enables, in particular, an especially simple and compact analysis apparatus to be produced despite the presence of a plurality of parallel conveying lines.

According to the invention each conveying line advantageously includes a plurality of rollers, each supported freely in rotation with respect to a transverse axis of rotation orthogonal to the longitudinal direction, and spaced from one another in the longitudinal direction in such a way that two successive rollers define between them an individual support receptacle for a product, and the drive device is adapted to drive the rollers in rotation between the analysis stations.

An analysis apparatus according to the invention advantageously includes at least one conveying line as described in EP-527 519, or EP-670 276, or EP-1 000 883 or EP-1 040 058. Nevertheless, the invention is also compatible with other types of conveying line.

In addition, it includes a processing unit adapted to receive signals representing images produced by the optical analysis stations and to calculate according to predefined programmed criteria data that can be utilized for sorting the products.

The invention also relates to an apparatus for optically analyzing products wherein there are provided in combination all or some of the characteristics mentioned hereinbefore or hereinafter.

Other objects, characteristics and advantages of the invention will be apparent from the following description of an embodiment of the invention given solely as a non-limiting example, and with reference to the appended Figures, in which:

FIG. 4 is a schematic side view of the different analysis stations of the apparatus of FIG. 1 illustrating the rotation of a product between the first analysis station and the last analysis station;

Figure 1:
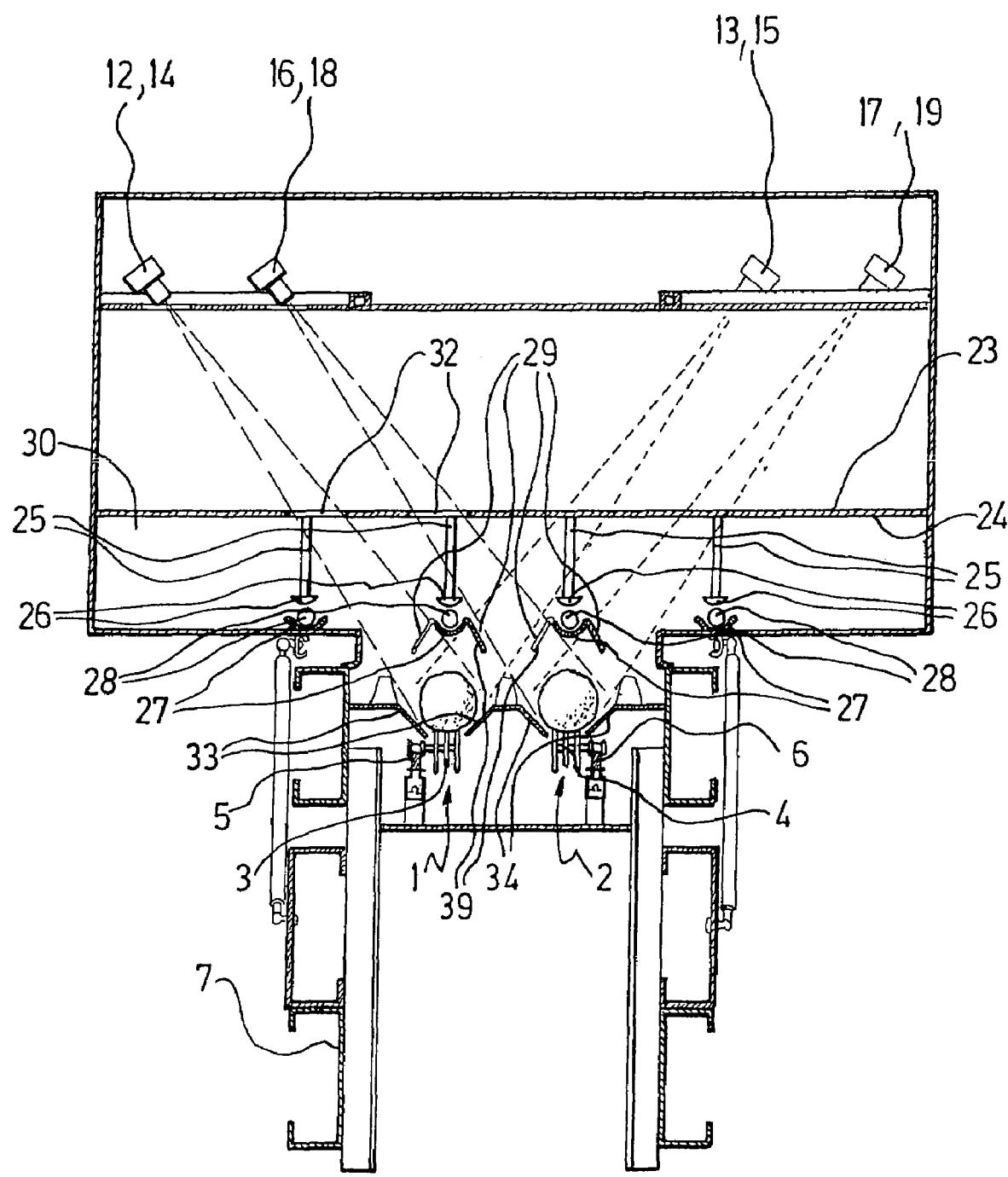
FIG. 1 is a schematic view in vertical cross-section of an optical analysis apparatus according to the invention.
Figure 2:
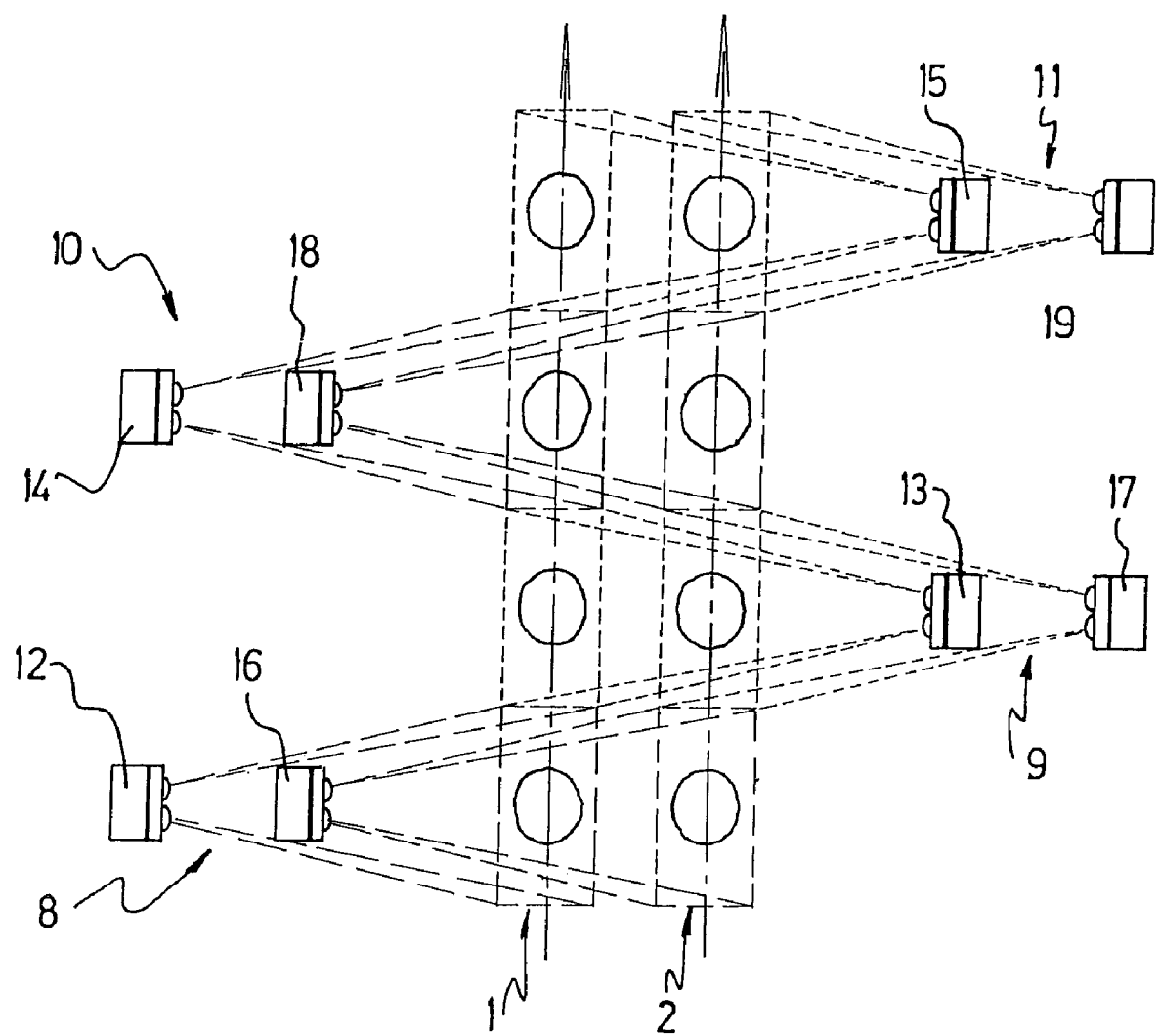
FIG. 2 is a schematic top view illustrating the arrangement of the imaging devices of the apparatus of FIG. 1.
Figure 5A:
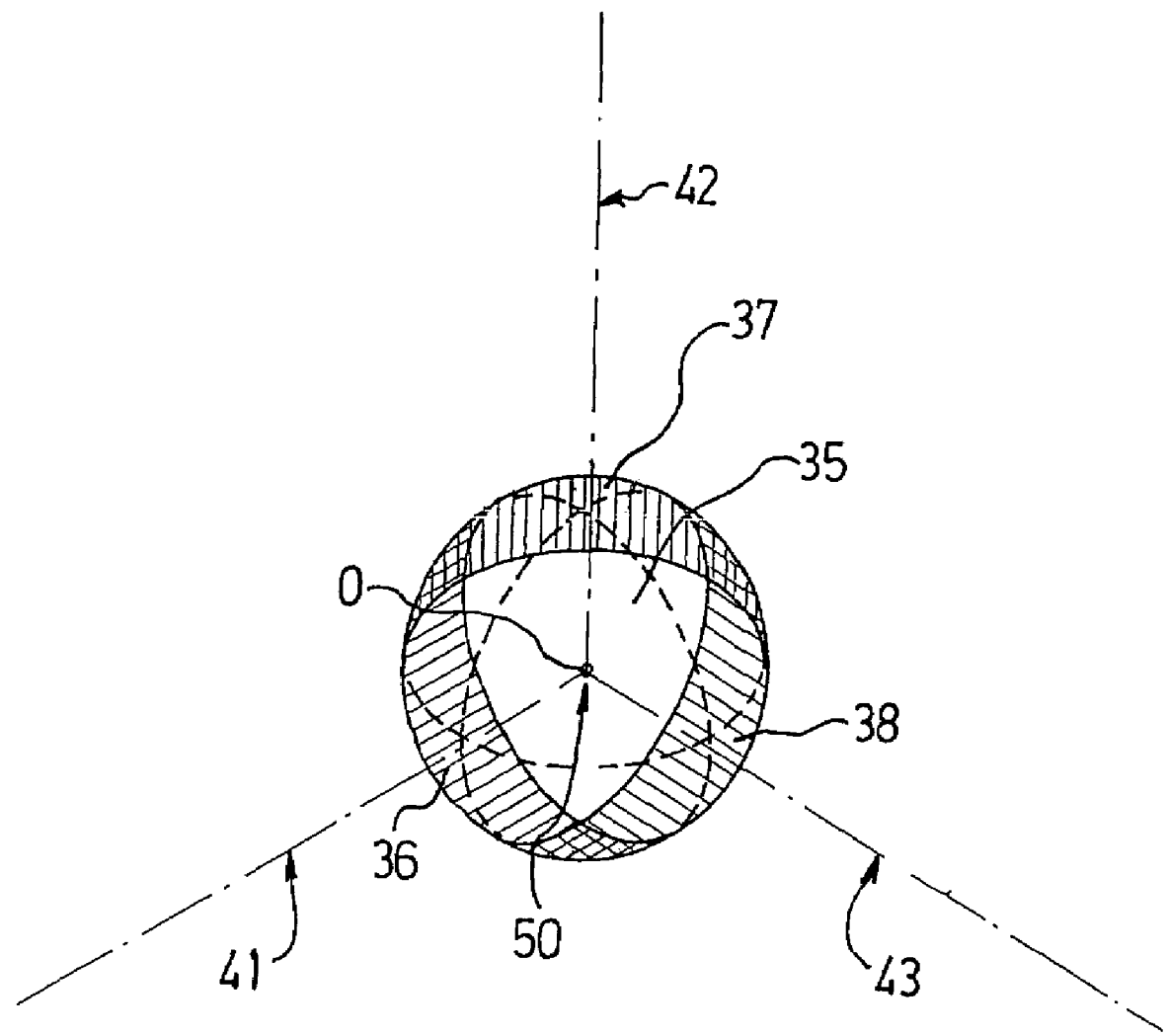
Figure 5B:
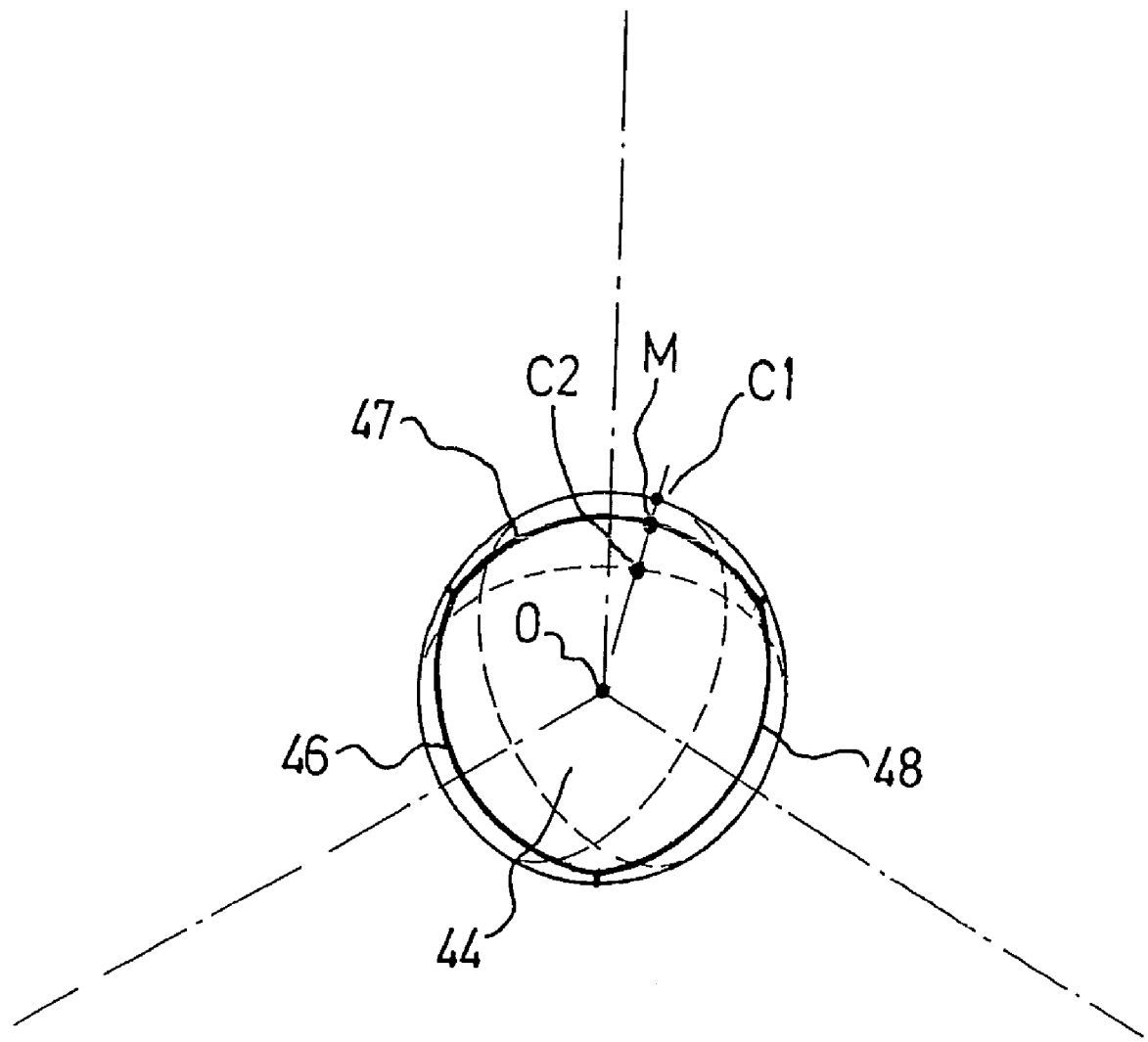

FIG. 5a it is a schematic diagram illustrating the different surface zones (spherical caps) of a product assumed perfectly spherical, as seen by the imaging devices of the apparatus of FIG. 1, and FIG. 5b is a schematic diagram illustrating a surface zone of a product assumed perfectly spherical as seen by an imaging device of the apparatus of FIG. 1 and taken into account for the optical analysis.

The analysis apparatus according to the invention illustrated in the Figures is installed on a conveying device of products which, in the example shown, are spheroidal and may be formed by fruit or vegetables. Said conveying device includes two parallel conveying lines 1, 2. Each of the conveying lines 1, 2 includes a plurality of rollers such as 3, 4, each mounted freely in rotation about a transverse axis of rotation and spaced in such a way that two successive rollers define between them a receptacle for a product. The axes of rotation of the rollers are driven by an endless chain 5, 6 coupled to a motor device, such that the two conveying lines 1, 2 are driven continuously through the optical analysis apparatus. The assembly is carried by a structure 7 resting on the ground. Such conveying lines are of the type described, for example, in EP-527 519, or EP-670 276, or EP-1 000 883 or EP-1 040 058, to which reference may be made for further details.

The analysis apparatus according to the invention in the example illustrated in the Figures includes four analysis stations 8, 9, 10, 11 arranged successively at a distance from one another along the conveying lines 1, 2, i.e. in the longitudinal direction of each conveying line 1, 2.

Each analysis station includes two imaging devices, one imaging device 12, 13, 14, 15 having its optical axis oriented towards the first conveying line 1, and the other 16, 17, 18, 19 having its optical axis oriented towards the second conveying line 2. The optical analysis apparatus therefore includes, for each conveying line 1, four successive imaging devices, one imaging device for each analysis station.

The imaging devices are mounted on the structure 7 at a level situated above that of the conveying lines 1, 2 and are offset laterally with respect to the longitudinal direction of the corresponding conveying line 1, 2. Of the four imaging devices of each conveying line 1, 2, two imaging devices 12, 14 and 16, 18 respectively are arranged on one side of the longitudinal vertical plane containing the longitudinal direction of the respective conveying line 1, 2, and the two other imaging devices 13, 15 and 17, 19 respectively are arranged on the other side of the longitudinal vertical plane.

Thus, as the products are transported in line along a conveying line 1, 2, each product passes individually in succession in front of the four imaging devices, namely a first imaging device 12, 16 located on one side, a second imaging device 13, 17 located on the other side, a third imaging device 14, 18 located on the same side as the first, and a fourth imaging device 15, 19 located on the same side of the second.

Figure 3:
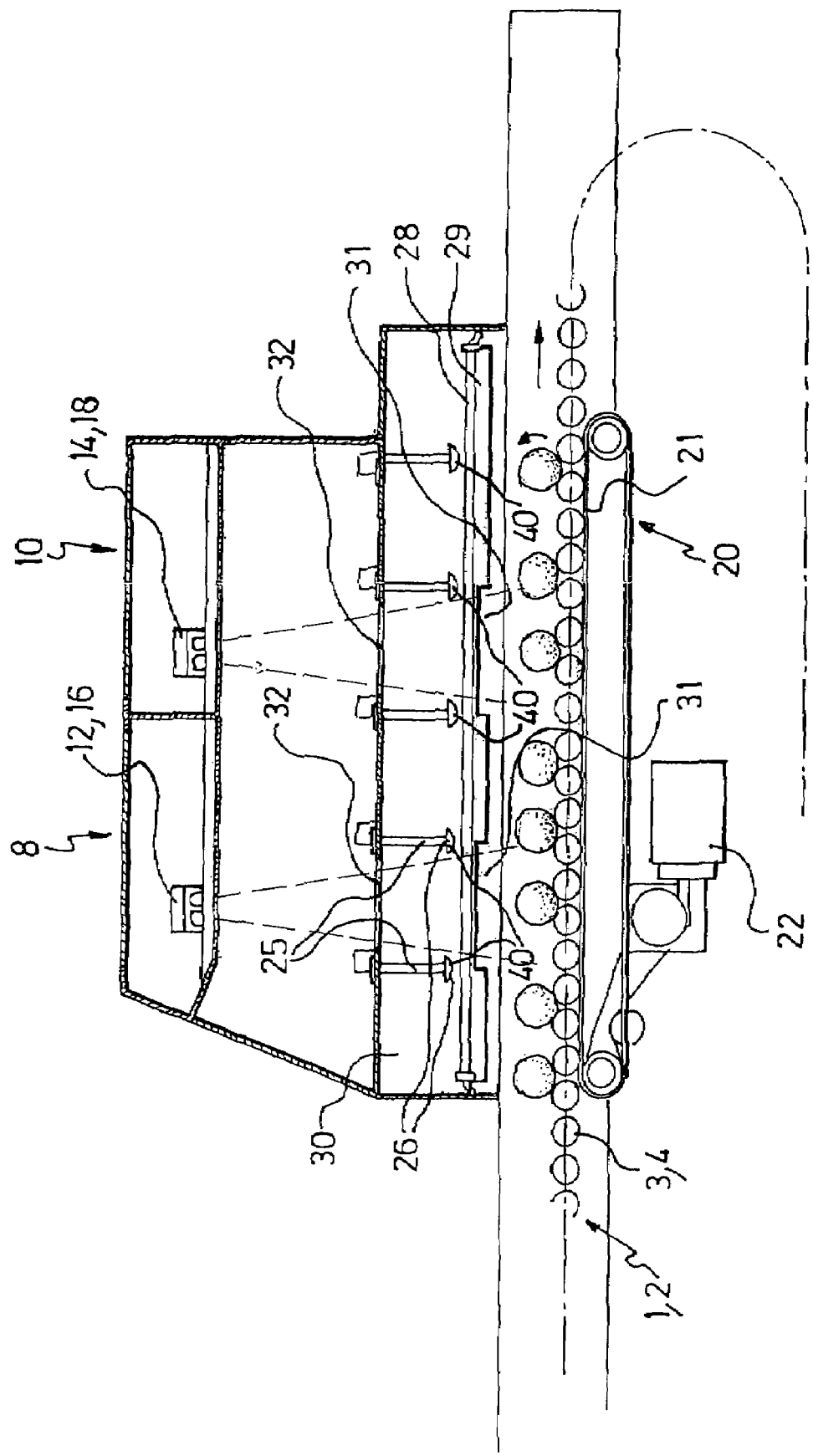
FIG. 3 is a schematic view in median longitudinal vertical section of the apparatus of FIG. 1 (the median profile interposed between the two conveying lines not being shown for reasons of clarity)

Furthermore, as shown in FIG. 3, a drive device 20 having an endless belt 21 driven by a motor 22 is arranged below the conveying lines 1, 2 in the portion thereof which passes in front of the analysis stations 8 to 11, so as to drive in rotation the rollers 3, 4 of the conveying lines 1, 2, and therefore the products carried between said rollers. The speed at which the belt 21 is driven by the motor 22 is determined as a function of a predetermined reference diameter of the products transported by the conveying lines 1, 2.

With an apparatus according to the invention, this speed may be fixed during manufacture, the practical dimensional variations of the products with respect to a reference diameter being capable of being taken into account as explained, for example, in WO 01/01071.

The speed of the drive device 20 is preferably so adapted that each product having the predetermined reference diameter transported by a conveying line 1, 2 is subjected to a rotation about a horizontal axis orthogonal to the longitudinal direction of the corresponding conveying line 1, 2 having a value of the order of $\pi/2$ between two successive analysis stations 8, 9; 9, 10; 10, 11. This rotation is illustrated in FIG. 4, in which the cross-section of each product is shown divided into four complementary sectors A, B, C, D of $\pi/2$.

More generally, the product is subjected to a rotation of the order of $2\pi/P$ between two successive analysis stations, P being the total number of successive analysis stations in the longitudinal direction of the corresponding conveying line 1, 2.

Between two imaging devices 8, 10 or 9, 11 located on the same side of the conveying line 1, 2, the product is subjected to a rotation of the order of $\pi$ in the example shown, i.e. more generally of the order of $2\pi/N1$ and $2\pi/N2$ respectively, N1 and N2 being the number of successive imaging devices located on the same side of the corresponding conveying line 1, 2. The imaging devices 12, 14 form a first lateral series of imaging devices all located on the same side of the longitudinal vertical plane of the conveying line 1 and extending successively parallel to the longitudinal direction of said conveying line 1. Likewise, the imaging devices 13, 15 constitute a second lateral series arranged on the side opposite to the first series formed by the imaging devices 12, 14. The imaging devices 16, 18 constitute the first lateral series of the conveying line 2 and the imaging devices 17, 19 constitute the second lateral series of the conveying line 2.

As can be seen in FIG. 1, the imaging devices are fixed to the structure 7 in such a way that their optical axes are oriented towards the corresponding conveying line 1, 2, and form an angle of from 20° to 45°, preferably of the order of 36°, with the median longitudinal vertical plane of said corresponding conveying line 1, 2.

The distance between the different analysis stations 8 to 11 in the longitudinal direction is preferably regular along the length of the analysis apparatus. For example, two successive analysis stations are separated by a distance that may be from 20 cm to 30 cm.

Each imaging device 12 to 19 preferably includes two cameras integrated in a single housing and adapted to produce photographs that are completely superposable, i.e. a camera in the visible region (RGB) and an infrared camera. These cameras are preferably of the type called "single-shot" cameras adapted to take of the order of 25 photographs per second or more. They supply digital data representing the images that can be transmitted to a data-processing unit capable of utilizing this data and programmed to this effect.

The analysis apparatus additionally includes a device for indirectly illuminating the products passing in front of the optical analysis stations. This illumination device includes an illumination chamber 30 having a horizontal wall 23 fixed to the structure 7 above the two conveying lines 1, 2 and having a reflective and diffusing lower face 24 covered with, for example, matt white paint. This wall 23 therefore forms a reflective and diffusing ceiling of the illumination chamber 30. The ceiling 23 carries a plurality of downwardly extending suspended elements 25 at the lower ends of which are fixed halogen lamps 26, their lower reflectors 40 being made, for example, of stainless steel or polished metal alloy, or being metallized, and being oriented in such a way as to shine upwardly, towards the lower face 24 of the wall 23, the bulbs of the lamps 26 being placed above the reflectors 40. In addition, four longitudinal profiles 27 extend between the lamps 26 and the level of the conveying lines 1, 2. These metal profiles 27 have a central longitudinal channel having a concave transverse cross-section the upwardly facing concavity of which receives luminous lighting tubes, for example, neon-type tubes 28 which are arranged above said channels. The profiles 27 have a reflective upper surface, in particular of polished metal alloy, for example stainless steel, or metallized, so that the light of the tubes 28 is reflected upwardly, i.e. towards the lower face 24 of the ceiling 23 which is itself reflective and diffusing.

The two central profiles 27 extend directly and vertically above the conveying lines 1, 2 and have a non-reflective lower surface 39 painted, for example, with matt black paint and downwardly-inclined lateral flanks 29 the function of which is to prevent any direct illumination of the products carried by the conveying lines 1, 2.

The structure 7 also defines, between the horizontal wall 23 that forms a reflective and diffusing ceiling and the conveying lines 1, 2, an enclosed space within the illumination chamber 30, the internal surfaces of which enclosed space are preferably reflective and diffusing and, in particular, are all painted with matt white paint. This enclosed space is delimited by peripheral walls comprising the ceiling 23, longitudinal lateral walls and transverse end walls which form a box. The conveying lines 1, 2 pass through the illumination chamber 30 formed by this box in the longitudinal direction. When the halogen lamps 26 uniformly distributed in the illumination chamber 30 and the tubes 28 contained in the illumination chamber are lit, it will be understood that they diffuse light upwardly towards the horizontal upper wall forming the ceiling 23, which light is reflected and diffused softly to bathe the illumination chamber 30 in a homogeneous diffuse light having a wavelength corresponding to the wavelength emitted by the lamps 26 and the tubes 28.

It should be noted that the lateral flanks 29 of the central profiles 27 have cut-out portions 31 so as not to interfere with the field of vision of the imaging devices of the different analysis stations, i.e. to allow a photograph to be taken of the complete face of a product passing in front of such an imaging device. Likewise, the wall 23 forming the ceiling is provided with through-apertures 32 so as not to mask the field of vision of the imaging devices through them. The imaging devices 12 to 19 are fixed to the structure 7 above the ceiling 23 outside the illumination chamber 30, so as not to be illuminated and blinded by the light prevailing in said illumination chamber 30.

In addition, two lateral longitudinal flanks 33, 34 are arranged on each side of each conveying line 1, 2 opposite the imaging devices 12 to 19, in such a way as to be oriented towards the imaging devices 12 to 19 and to form an absorbent background, for example, painted with matt black paint, before which background the photographed product passes.

For each imaging device 12 to 19, the zone of the opposed flank 33, 34 (substantially orthogonal to the optical axis of the imaging device) which extends in the longitudinal direction opposite the optical axis and the field of vision is adapted to form a background (in particular matt black). By contrast, the zone of the other lateral flank 34, 33 which also extends in the longitudinal direction opposite the optical axis and the field of vision of the imaging device is reflective (metal or metallized), or reflective and diffusing (painted with matt white paint), so as to form a reflector enhancing the illumination of the lower lateral surface portion of the product.

In this way, each flank 33, 34 is adapted alternately in the longitudinal direction to form a background (matt black zone) and to form a reflector (matt white or metal or metallized).

The flank 33 of the conveying line 1 and the flank 34 of the conveying line 2, which are both arranged between the two conveying lines 1, 2, may be formed by the same central profile interposed between the two conveying lines 1, 2, as shown in FIG. 1.

The optical analysis apparatus according to the invention allows the production of uniform homogenous illumination of the fruit, which illumination is substantially identical for all the optical analysis stations. The different imaging devices 12 to 19 are inclined at the same angle with respect to the vertical and take photographs which are similar regarding the geometrical orientation of the image taken with respect to the product.

FIG. 5a shows schematically the different zones 35, 36, 37, 38 of a sphere that can be seen by the different successive imaging devices 12, 13, 14, 15 or 16, 17, 18, 19 as this sphere passes through the optical analysis apparatus according to the invention. The zones are hemispherical caps 35, 36, 37, 38. The optical axis 50 of the first imaging device 12 or 16 is assumed normal to the plane of FIG. 5a and above this plane. The path of this optical axis 50 is the centre O of the circle represented. The paths of the optical axes 41, 42, 43 of the three other imaging devices 13, 14, 15 or 17, 18, 19 are disposed at 120° to one another, the four optical axes 50, 41 to 43 being oriented in space to form a regular tetrapod and intersecting at the centre of the sphere. The three hemispherical caps 36, 37, 38 seen by these three other imaging devices are areas partially shown, with hatching parallel to the corresponding optical axis 41, 42, 43.

As can be seen, all portions of the product are seen and represented in the images taken, with a degree of overlap.

FIG. 5b shows with continuous lines the zone 44 of the hemispherical cap 35, seen in plan view in FIG. 5a, which is taken into account for the optical analysis. In each zone of overlap between the hemispherical cap 35 and one of the three other hemispherical caps 36, 37, 38, a portion of the median equatorial lines 46, 47, 48 at the equators of these two hemispherical caps is determined and memorized, and, for the optical analysis, the pixels of the photographs located outside the zone 44 delimited by these three median equatorial lines 46, 47, 48 are eliminated. In this way, the surface of the sphere is divided into four complementary zones all identical to the zone 44. Each median equatorial line 46, 47, 48 belongs to an internal bisectional equatorial plane of the equatorial planes containing the equators of the two caps 35 and 36 or 37 or 38 which overlap.

Each point M on this equatorial line is equidistant (on the surface of the sphere) from a point C1 belonging to the equator of the cap 35 and from a point C2 belonging to the other overlapping cap 36, 37, 38, the projections of these points C2, M, C1 on the plane of FIG. 5a belonging to the same radius R of the circle representing the cap 35. In the plane of FIG. 5a (corresponding to that of the image formed), the distance OM is a fraction of the radius R (equal to half the reference diameter). The position of point M is therefore represented by the relation OM/R.

In the analysis of a product which is not perfectly spherical, for each image taken by an imaging device that is considered (and which does not correspond to a perfectly hemispherical cap), the median limit of the zone to be considered (similar to zone 44) is determined by applying to the distance OC between O and the point C of the contour located in this radial direction, in each radial direction starting from the optical axis represented by point O, the same fraction OM/R as that obtained and memorized for the perfect sphere. The point M' of the median limit on the flat image taken is therefore such that OM'=OC×OM/R. The programming logic of the processing unit on the basis of photographs of this kind can therefore be extremely simple and reliable, even in the case of distorted shapes.

All the imaging devices may be identical and all are arranged at an equal distance from the products carried by the conveying lines 1, 2.

It will be understood that such an optical analysis apparatus is extremely simple to install, to control and to maintain. The structure 7 forms an outer protective case provided with access covers for the different internal elements of the optical analysis apparatus according to the invention.

The signals emitted by the imaging devices are supplied to a processing unit (not shown) well-known per se in which the different images taken are memorized and which allows them to be subsequently processed and analyzed with a view to automatic sorting at a subsequent station of the product conveying device. The processing unit may be constructed in a manner known per se. It is advantageously formed by a data-processing device such as a personal computer.

It should be noted that the invention may be the subject of numerous variants with respect to the examples illustrated and described. For example, it is possible to provide more than two analysis stations on each side of a conveying line 1, 2. The number of analysis stations on each side may be different on one side than on the other. A value of 36° for the angle of inclination of the optical axes of the imaging devices with respect to the median longitudinal vertical plane is very advantageous in practice. It corresponds to the theoretically ideal angle of orientation of the optical axes whereby they coincide with the axes of a regular tetrapod centered on the centre of the sphere if the product is spherical. Nevertheless, other angle values may also be used. The number, type and arrangement of the light sources in the illumination chamber 30 may be different. Instead of a single illumination chamber, a plurality of illumination chambers may be provided, for example, different illumination chambers for the conveying lines and/or a plurality of illumination chambers arranged in series in the longitudinal direction, in particular one for each optical analysis station. The matt white paint may be replaced by other light-colored coatings, provided an effect of reflection and diffusion is obtained. Similarly, the matt black paint may be replaced by any dark coating able to form an appropriate background.

The drive device 20 may be adapted to drive the products in rotation either in the reverse direction with respect to their direction of transportation in the longitudinal direction, as shown in FIG. 3, or, on the contrary, in the forward direction.

The invention claimed is:

1. Apparatus for optically analyzing products that are substantially rotationally symmetrical—in particular substantially spheroidal—such as fruit, so that they can be sorted automatically, comprising:
    at least one conveying line for transporting the products in a continuous line in a longitudinal direction with respect to a fixed structure and comprising a plurality of individual supports of the products aligned one behind the other in the longitudinal direction;
    a plurality of P stations for optically analyzing the external surface of the products, said analysis stations being disposed successively at a distance from one another in the longitudinal direction and each comprising at least one imaging device fixed to the structure and having an optical axis oriented towards a conveying line so as to be able to produce images of the products being transported in line past said imaging device by said conveying line;
    a device for driving in rotation each product carried by a conveying line during its transportation past the different successive analysis stations in such a way that different faces of each product are seen by the different successive imaging devices,
    wherein
    each imaging device is arranged above the conveying line towards which it is oriented and is offset laterally with respect to a longitudinal vertical plane containing the longitudinal direction;
    the different imaging devices of the different analysis stations are arranged in two lateral series of imaging devices, a first lateral series located on one side of the longitudinal vertical plane and comprising N1 imaging devices belonging to P1 different analysis stations, and a second lateral series located on the other side of the longitudinal vertical plane and comprising N2 imaging devices belonging to P2 different analysis stations, N1, N2, P1 and P2 being whole numbers other than zero.

2. Apparatus as claimed in claim 1, wherein the drive device is so adapted that a product having a predetermined reference diameter is subjected to a rotation on itself about an axis substantially orthogonal to the longitudinal direction, of the order of or greater than $2\pi - 2\pi/(P1+P2)$ between the first and the last analysis stations in the longitudinal direction.

3. Apparatus as claimed in claim 1, wherein $P1 \geq 2$, $P2 \geq 2$, the imaging devices of the first lateral series belong to analysis stations different from those (9, 11) to which the imaging devices of the second lateral series belong, the drive device is so adapted that a product having a predetermined reference diameter is subjected to a rotation on itself of the order of $2\pi/P1$ between two successive analysis stations of the first lateral series and of the order of $2\pi/P2$ between two successive analysis stations of the second lateral series.

4. Apparatus as claimed in claim 3, wherein the imaging devices of the first lateral series and those of the second lateral series are intercalated alternately in the longitudinal direction, two analysis stations directly successive in the longitudinal direction having, in the one case, an imaging device belonging to the first lateral series and, in the other case, an imaging device belonging to the second lateral series.

5. Apparatus as claimed in claim 4, wherein $P1=P2=P/2$, the spacing between the successive analysis stations in the longitudinal direction is regular, the drive device is so adapted that a product having a predetermined reference diameter is subjected to a rotation on itself of the order of $2\pi/P$ between two successive analysis stations.

6. Apparatus as claimed in claim 1, wherein the imaging devices are so arranged that their optical axes form a predetermined angle, called the angle of inclination of from 20° to 45° with the longitudinal vertical plane.

7. Apparatus as claimed in claim 1, wherein all the imaging devices of the same lateral series are so arranged that their optical axes all form the same angle of inclination with the longitudinal vertical plane.

8. Apparatus as claimed in claim 7, wherein the angle of inclination formed with the longitudinal vertical plane by the optical axes of the imaging devices of the first lateral series is equal to the angle of inclination formed with the longitudinal vertical plane by the optical axes of the imaging devices of the second lateral series.

9. Apparatus as claimed in claim 6, wherein the angle of inclination of the optical axes of the imaging devices with respect to the longitudinal vertical plane is of the order of 36°.

10. Apparatus as claimed in claim 1, wherein $P1=P2=2$.

11. Apparatus as claimed in claim 1, wherein each analysis station includes a single imaging device for each conveying line.

12. Apparatus as claimed in claim 1, wherein all the imaging devices of the same lateral series oriented towards the same conveying line are fixed to the frame at the same level and with the same lateral offset with respect to the longitudinal direction of said conveying line.

13. Apparatus as claimed in claim 1, wherein all the imaging devices are fixed to the structure at the same horizontal level above the conveying line(s).

14. Apparatus as claimed in claim 1, wherein it also includes an illumination device arranged above the products being transported in line past the analysis stations and, located opposite each imaging device with respect to the conveying line towards which it is oriented, a screen forming a background for each image taken.

15. Apparatus as claimed in claim 1, wherein it includes for each imaging device at least one reflector, called the lower lateral reflector, arranged beside and along the corresponding conveying line and adapted to enhance the illumination of a lower lateral surface zone of the products.

16. Apparatus as claimed in claim 1, wherein each imaging device is adapted to take several successive photographs of each product moving past in line.

17. Apparatus as claimed in claim 1, wherein each imaging device includes a plurality of cameras taking photographs of different optical types.

18. Apparatus as claimed in claim 1, wherein it comprises:
at least two parallel conveying lines arranged substantially in the same horizontal plane;
for each analysis station, at least one pair of imaging devices, one of which is oriented towards one of the conveying lines while the other is orientated towards another conveying line.

19. Apparatus as claimed in claim 1, wherein each conveying line includes a plurality of rollers each supported freely in rotation with respect to a transverse axis of rotation orthogonal to the longitudinal direction and spaced from one another in the longitudinal direction in such a way that two successive rollers define between them an individual support receptacle for a product, and wherein the drive device is adapted to drive the rollers in rotation between the analysis stations.

20. Apparatus as claimed in claim 1, wherein the imaging devices of the first lateral series and those of the second lateral series are intercalated alternately in the longitudinal direction, two analysis stations directly successive in the longitudinal direction having, in the one case, an imaging device belonging to the first lateral series and, in the other case, an imaging device belonging to the second lateral series.

* * * * *